United States Patent
Lewinski et al.

(10) Patent No.: US 11,414,770 B2
(45) Date of Patent: Aug. 16, 2022

(54) WATER ELECTROLYZERS

(71) Applicant: 3M INNOVATIVE PROPERTIES COMPANY, St. Paul, MN (US)

(72) Inventors: Krzysztof A. Lewinski, Mahtomedi, MN (US); Sean M. Luopa, Minneapolis, MN (US); Jiyoung Park, Woodbury, MN (US); Attila Molnar, Vadnais Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 172 days.

(21) Appl. No.: 16/497,883

(22) PCT Filed: Mar. 28, 2018

(86) PCT No.: PCT/IB2018/052147
§ 371 (c)(1),
(2) Date: Sep. 26, 2019

(87) PCT Pub. No.: WO2018/185616
PCT Pub. Date: Oct. 11, 2018

(65) Prior Publication Data
US 2020/0048782 A1    Feb. 13, 2020

Related U.S. Application Data

(60) Provisional application No. 62/480,787, filed on Apr. 3, 2017.

(51) Int. Cl.
C25B 9/23    (2021.01)
C25B 1/04    (2021.01)
(Continued)

(52) U.S. Cl.
CPC .............. *C25B 9/23* (2021.01); *B01J 23/42* (2013.01); *B01J 23/468* (2013.01); *B01J 23/54* (2013.01);
(Continued)

(58) Field of Classification Search
CPC .......... C25B 13/08; C25B 11/097; C25B 1/04
See application file for complete search history.

(56) References Cited

U.S. PATENT DOCUMENTS 4,340,276 A    7/1982    Maffitt
4,465,580 A    8/1984    Kasuya
(Continued)

FOREIGN PATENT DOCUMENTS

EP    0631337    12/1994
EP    2704239    3/2014
(Continued)

OTHER PUBLICATIONS

Chang, "Proton-conducting composite membranes derived from sulfonated hydrocarbon and inorganic materials", Journal of power sources, 2003, vol. 124, pp. 18-25.
(Continued)

*Primary Examiner* — Harry D Wilkins, III
(74) *Attorney, Agent, or Firm* — Lynn R. Hunsberger

(57)    ABSTRACT

Water electrolyzer comprising a membrane having first and second opposed major surfaces, a thickness extending between the first and second major surfaces, and first, second, and third regions equally spaced across the thickness, wherein the first region is the closest region to the first major surface, wherein the second region is the closest region to the second major surface, wherein the third region is located between the first and second regions, wherein the first and third regions are each essentially free of both metallic Pt and Pt oxide, and wherein the second region (Continued)

comprises at least one of metallic Pt or Pt oxide; a cathode comprising a first catalyst on the first major surface of the membrane; and an anode comprising a second catalyst on the second major surface of the membrane.

13 Claims, 1 Drawing Sheet

(51) Int. Cl.
| | | |
|---|---|---|
| | *C25B 13/08* | (2006.01) |
| | *B01J 23/42* | (2006.01) |
| | *B01J 23/46* | (2006.01) |
| | *B01J 23/54* | (2006.01) |
| | *C25B 13/04* | (2021.01) |
| | *C25B 9/73* | (2021.01) |

(52) U.S. Cl.
CPC ............... *C25B 1/04* (2013.01); *C25B 9/73* (2021.01); *C25B 13/04* (2013.01); *C25B 13/08* (2013.01)

(56) References Cited

U.S. PATENT DOCUMENTS

| | | | |
|---|---|---|---|
| 4,568,598 | A | 2/1986 | Bilkadi |
| 4,812,352 | A | 3/1989 | Debe |
| 5,039,561 | A | 8/1991 | Debe |
| 5,338,430 | A | 8/1994 | Parsonage |
| 5,342,494 | A | 8/1994 | Shane |
| 5,472,799 | A | 12/1995 | Watanabe |
| 5,480,518 | A | 1/1996 | Shane |
| 5,766,787 | A * | 6/1998 | Watanabe ........... H01M 8/1051 429/494 |
| 5,800,938 | A | 9/1998 | Watanabe |
| 5,879,827 | A | 3/1999 | Debe |
| 5,879,828 | A | 3/1999 | Debe |
| 5,919,583 | A | 7/1999 | Grot |
| 6,040,077 | A | 3/2000 | Debe |
| 6,136,412 | A | 10/2000 | Spiewak |
| 6,319,293 | B1 | 11/2001 | Debe |
| 6,624,328 | B1 | 9/2003 | Guerra |
| 6,630,265 | B1 | 10/2003 | Taft, III |
| 7,029,559 | B2 | 4/2006 | Won |
| 7,183,017 | B2 | 2/2007 | Taft, III |
| 7,348,088 | B2 | 3/2008 | Hamrock |
| 7,419,741 | B2 | 9/2008 | Vernstrom |
| 7,732,080 | B2 | 6/2010 | Sandi-Tapia |
| 7,901,829 | B2 | 3/2011 | Debe |
| 2002/0004453 | A1 | 1/2002 | Haugen |
| 2002/0100725 | A1 | 8/2002 | Lee |
| 2004/0048466 | A1 | 3/2004 | Gore |
| 2004/0116742 | A1 | 6/2004 | Guerra |
| 2006/0046122 | A1 | 3/2006 | Chang |
| 2007/0037030 | A1 | 2/2007 | Ogami |
| 2007/0072036 | A1 | 3/2007 | Berta |
| 2007/0087258 | A1 | 4/2007 | Mei |
| 2008/0113242 | A1 | 5/2008 | Smith |
| 2011/0036935 | A1 | 2/2011 | Stehr |
| 2011/0151353 | A1 | 6/2011 | Haug |
| 2011/0198232 | A1 | 8/2011 | Cipollini |
| 2011/0223523 | A1 | 9/2011 | Lopez |
| 2014/0246304 | A1 | 9/2014 | Debe |

FOREIGN PATENT DOCUMENTS

| | | |
|---|---|---|
| WO | WO 94-20648 | 9/1994 |
| WO | WO 2016-191057 | 12/2016 |
| WO | WO 2018/115821 A1 * | 6/2018 ............ C25B 13/02 |
| WO | WO 2018-185615 | 10/2018 |
| WO | WO 2018-185617 | 10/2018 |

OTHER PUBLICATIONS

Chow, "Fabrication of biologically based microstructure composites for vacuum field emission", Materials Science and Engineering, 1992, A158,pp. 1-6.

Debe, "Effect of gravity on copper phthalocyanine thin films I: Enhanced smoothness and local homogeneity of copper phthalocyanine thin films grown in a microgravity environment", Thin Solid Films, 186, 1990, pp. 257-288.

Debe, "Effect of gravity on copper phthalocyanine thin films III: Microstructure comparisons of copper phthalocyanine thin films grown in microgravity and unit gravity", Thin Solid Films, 186, 1990, pp. 327-347.

Debe, "Vacuum vapor deposited thin films of a perylene dicarboximide derivative: Microstructure versus deposition parameters", J. Vac. Sci. Technol. A, 1988, vol. 6, No. 3, pp. 1907-1911.

Hou, "High-performance membrane electrode assembly with multi-functional Pt/SnO2—SiO2/C catalyst for proton exchange membrane fuel cell operated under low-humidity conditions", International Journal of Hydrogen Energy, 2016, vol. 41, No. 21, 9197-9203.

Kam, "Summary Abstract: Dramatic variation of the physical microstructure of a vapor deposited organic thin film", J. Vac. Sci. Technol. A, 1987, vol. 5, No. 4, pp. 1914-1916.

Lee, "Measurement and modeling of the reflectance-reducing properties of gradient index microstructured surfaces", Photo. Sci. and Eng., 1980, vol. 24, No. (4), pp. 211-216.

Lee, "Nafion based organic/inorganic composite membrane for air-breathing direct methanol fuel cells", Journal of membrane science, 2007, vol. 292, pp. 29-34.

Mittelsteadt, "Electrolyzer Membranes", Polymer Science: A Comprehensive Reference, vol. 10, 2012, pp. 849-871.

Luo, "Tin and Silicon Binary Oxide on the Carbon Support of a Pt Electrocatalyst with Enhanced Activity and Durability", ACS Catalyst, 2015, vol. 5,No. 4, pp. 2242-2249.

Nicotera, "NMR and electrochemical investigation of the transport properties of methanol and water in nafion and clay-nanacomposites membranes for DMFCs", Membranes, 2012, vol. 2, No. 2, pp. 325-345.

Sadaoka, "Effects of morphology on $NO_2$ detection in air at room temperature with phthalocyanine thin films", J. Mat. Sci., 25, 1990, pp. 5257-5268.

Self-humidifying polymer electrolyte, American Chemical Society, 2016, 108pages.

Steeb. "Rapidly Quenched Metals, Proc. of the Fifth Int. Conf. on Rapidly Quenched Metals", Germany, Elsevier Science Publishers B.V., New York, (1985), pp. 1117-1124.

Tang, "High Dispersion and Electrocatalytic Properties of Platinum on Well-Aligned Carbon Nanotube Arrays," Carbon, 42, (2004), 191-197.

Wang, "Controlling fuel crossover and hydration in ultrathin proton exchange membrane-based fuel cells using Pt-nanosheet catalysts", J. Mater. Chem. A, 2014, vol. 2, pp. 16416-16423.

Watanabe, "Analyses of self-humidification and suppression of gas crossover in Pt-dispersed polymer electrolyte membranes for fuel cells", J. Electrochem. Soc., 1998, vol. 145, No. 4, pp. 1137-1141.

Watanabe, "Self-humidifying polymer electrolyte membranes for fuel cells", J. Electrochem. Soc., 1996, vol. 143, No. 12, pp. 3847-3852.

Wu, "A sandwich structured membrane for direct methanol fuel cells operating with neat methanol", Applied Energy, 2013, vol. 106, pp. 301-306.

International Search report for PCT International Application No. PCT/IB2018/052147 dated Jun. 11, 2018, 4 pages.

* cited by examiner

WATER ELECTROLYZERS

CROSS REFERENCE TO RELATED APPLICATIONS

This application is a national stage filing under 35 U.S.C. 371 of PCT/IB2018/052147, filed Mar. 28, 2018, which claims the benefit of U.S. Application No. 62/480,787, filed Apr. 3, 2017, the disclosure of which is incorporated by reference in its/their entirety herein.

BACKGROUND

Water electrolyzers are common electrochemical devices for producing ultra-pure (e.g., typically, at least 99.9% pure) hydrogen from pure water. In the case of proton exchange membrane (PEM) based water electrolyzers, hydrogen can be obtained at high pressure. These electrolyzers often contain membrane electrode assemblies (MEAs) similar to proton exchange membrane electrode assemblies for fuel cells. PEM based water electrolyzers, however, produce hydrogen at the cathode via a hydrogen evolution reaction (HER) and oxygen at the anode via an oxygen evolution reaction (OER). The designation of the electrodes as anode or cathode in an electrochemical device follows the IUPAC convention that the anode is the electrode at which the predominant reaction is oxidation (e.g., the $H_2$ oxidation electrode for a fuel cell, or the water oxidation/$O_2$ evolution reaction electrode for a water or $CO_2$ electrolyzers).

Higher operating pressures on the water electrolyzer cathode (e.g., even approaching 50 bar) create a situation known in the field as hydrogen crossover, where the hydrogen gas ($H_2$) crosses from the cathode where it is produced through the PEM back to the anode. This situation creates both an efficiency loss and in some situations an undesired amount of $H_2$ mixing with the anode gas ($O_2$) (e.g., exceeds 4 vol. %, which is about the lower explosive limit (LEL)).

There is a desire to mitigate this crossover of hydrogen to the anode.

SUMMARY

In one aspect, the present disclosure describes a water electrolyzer comprising:
  a membrane having first and second opposed major surfaces, a thickness extending between the first and second major surfaces, and first, second, and third regions equally spaced across the thickness, wherein the first region is the closest region to the first major surface, wherein the second region is the closest region to the second major surface, wherein the third region is located between the first and second regions, wherein the first and third regions are each essentially free of both metallic Pt and Pt oxide (i.e., no greater than 0.001 mg/cm³ Pt, calculated as elemental Pt), and wherein the second region comprises at least one of metallic Pt or Pt oxide;
  a cathode comprising a first catalyst on the first major surface of the membrane; and
  an anode comprising a second catalyst on the second major surface of the membrane.

In another aspect, the present disclosure provides a method of generating hydrogen and oxygen from water, the method comprising:
  providing a water electrolyzer described herein;
  providing water in contact with the anode; and
  providing an electrical current with sufficient potential difference across the membrane to convert at least a portion of the water to hydrogen and oxygen on the cathode and anode, respectively.

DETAILED DESCRIPTION

Figure 1:
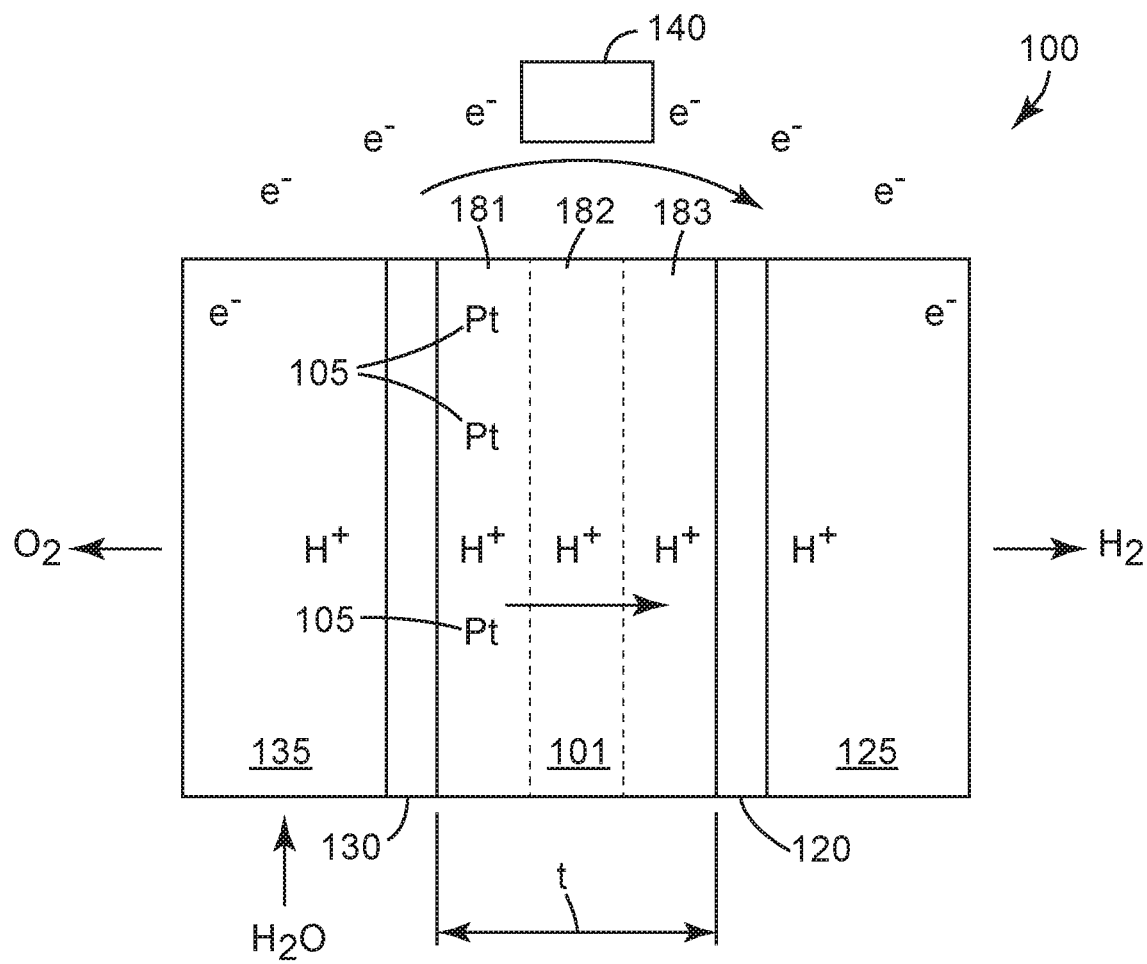
FIG. 1 is a schematic of an exemplary water electrolyzer described herein.

Single cell water electrolyzers are known, but water electrolyzers typically comprise a plurality (e.g., at least two) of cells that in turn comprise a membrane, cathode, and anode. Referring to FIG. 1, exemplary water electrolyzer cell 100 comprising membrane 101, cathode 120, and anode 130. Membrane 100 has first, second, and third regions 181, 182, 183, respectively, equally spaced across thickness t. First and third regions 181, 183, respectively, are each essentially free of both metallic Pt and Pt oxide. Second region 182 comprises platinum 105, in the form of at least one of metallic Pt or Pt oxide. Platinum 105 may be supported platinum. As shown, cell 100 also includes optional first fluid transport layer (FTL) 135 adjacent anode 130, and optional second fluid transport layer 125 situated adjacent cathode 120. FTLs 125 and 135 can be referred to as diffuser/current collectors (DCCs) or gas diffusion layers (GDLs). In operation, water is introduced into the anode portion of cell 100, passing through first fluid transport layer 135 and over anode 130. Power source 140 applies an electrical current source on cell 100.

In some embodiments, membrane 101 is a proton exchange membrane (PEM) that preferentially permits hydrogen ions (solvated protons) to pass through the membrane to the cathode portion of the cell, thus conducting an electrical current through the membrane. The electrons cannot normally pass through the membrane and, instead, flow through an external electrical circuit in the form of electrical current.

The hydrogen ions (H) combine with the electrons at cathode 120 to form hydrogen gas, and the hydrogen gas is collected through second fluid transport layer 125 situated adjacent cathode 120. Oxygen gas is collected at the anode of cell 100 via first fluid transport layer 135 situated adjacent anode 130.

Gas diffusion layer (GDL) 135 facilitates water and oxygen gas transport to and from the anode, respectively, and hydrogen ions ($H^+$) and water (carried electro-osmotically through the PEM membrane with the solvated protons) transport from the anode through the membrane to the cathode, conducting electrical current. Also, some of the produced hydrogen gas transports through the membrane from the cathode to the anode by diffusion, resulting in undesired "hydrogen crossover". GDLs 125, 135 are both porous and electrically conductive, and on the cathode side are typically composed of carbon fibers. However, in order to avoid degradation of carbon at the high potentials of the anode, it is preferred to use a more corrosion resistant material, such as porous titanium, as the GDL on the anode. The GDL may also be called a fluid transport layer (FTL) or a diffuser/current collector (DCC). In some embodiments, the anode and cathode layers are applied to GDLs and the resulting catalyst-coated GDLs (also called CCBs catalyst coating backings) are sandwiched with a polymer electrolyte such as a PEM to form a five-layer MEA. The five layers of such a five-layer MEA are, in order: anode GDL, anode layer, ion conducting membrane, cathode layer, and cathode GDL. The anode layer and cathode layer typically comprise an anode catalyst and a cathode catalyst, respectively. In other embodiments, the anode and cathode layers are applied to either side of the ion conducting membrane, and the resulting catalyst-coated membrane (CCM) is sandwiched between two GDLs (or FTLs) to form a five-layer MEA.

An ion conducting membrane used in a CCM or MEA described herein may comprise any suitable polymer electrolyte. Exemplary polymer electrolytes typically bear anionic functional groups bound to a common backbone, which are typically sulfonic acid groups but may also include carboxylic acid groups, imide groups, imide acid groups, amide groups, or other acidic functional groups. Anion conducting membranes comprising cationic functional groups bound to a common backbone are also possible, but are less commonly used. Exemplary polymer electrolytes are typically highly fluorinated and most typically perfluorinated (e.g., at least one of perfluorosulfonic acid and perfluorosulfonimide acid). Exemplary electrolytes include copolymers of tetrafluoroethylene and at least one fluorinated, acid-functional co-monomer. Typical polymer electrolytes include those available from DuPont Chemicals, Wilmington, Del., under the trade designation "NAFION;" Solvay, Brussels, Belgium, under the trade designation "AQUIVION;" and from Asahi Glass Co. Ltd., Tokyo, Japan, under the trade designation "FLEMION." The polymer electrolyte may be a copolymer of tetrafluoroethylene (TFE) and $FSO_2$—$CF_2CF_2CF_2CF_2$—O—CF=$CF_2$, described in U.S. Pat. No. 6,624,328 (Guerra) and U.S. Pat. No. 7,348,088 (Hamrock et al.), and U.S. Pub. No. 2004/0116742 (Guerra), the disclosures of which are incorporated herein by reference. The polymer typically has an equivalent weight (EW) up to 1200 (in some embodiments, up to 1100, 1000, 900, 825, 800, 725, or even up to 625).

The polymer can be formed into a membrane by any suitable method. The polymer is typically cast from a suspension. Any suitable casting method may be used, including bar coating, spray coating, slit coating, and brush coating. Alternately, the membrane may be formed from neat polymer in a melt process such as extrusion. After forming, the membrane may be annealed, typically at a temperature of at least 120° C. (in some embodiments, at least 130° C., 150° C., or higher). The membrane typically has a thickness up to 250 micrometers (in some embodiments, up to 225 micrometers, 200 micrometers, 175 micrometers, 150 micrometers, 100 micrometers, or even up to 50 micrometers).

The polymer membrane can also include a support matrix consisting of a porous network of interlinked fibers that will provide the ion exchange polymer (ionomer) with additional mechanical strength to withstand the sometimes large pressure differentials across the membrane due to the high pressure of the cathode side during hydrogen evolution. The support matrix can be made of an expanded polytetrafluoroethylene (e.g., that available under the trade designation "TEFLON" from DuPont Chemicals, Wilmington, Del.), or a partially fluorinated fibrous matrix that will be stable in the acidic environment of the ionomer.

In some embodiments, the membrane has a first proton conducting polymer reinforced with a nanofiber mat; wherein the nanofiber mat is made from a nanofiber comprising a fiber material selected from polymers and polymer blends; wherein the fiber material has a fiber material proton conductivity; wherein the first proton conducting polymer has a first proton conducting polymer conductivity; and wherein the fiber material proton conductivity is less than the first proton conducting polymer conductivity.

In some embodiments, the fiber material in the membrane may include highly fluorinated polymer, perfluorinated polymer, hydrocarbon polymer, or blends and combinations thereof. In some embodiments, the fiber material in the membrane may include a polymer suitable for electrospinning selected from the group consisting of polyvinylidene fluoride (PVDF), polysulfone (PSU), poly(ethersulfone) (PES), polyethylenimine (PEI), polybenzimidazole (PBI), polyphenylene oxide (PPO), polyether ether ketone (PEEK), polyphenylene ether sulfone (PPES), poly ether ketone (PEK), blends, and combinations thereof. In some embodiments, the fiber material in the membrane may be an electrospun nanofiber.

Typically, it is desirable that the membrane be free of any Ce or Mn (i.e., no greater than 0.001 mg/cm$^3$ of either Ce or MN, calculated as elemental Ce and Mn, respectively.

Additional details for exemplary membranes can be found, for example, in U.S. Pat. Pub. Nos. 2008/0113242, 2002/0100725, and 2011/036935, the disclosures of which are incorporated herein by reference.

Optionally, the membrane is washed in acid (e.g., 1.0 molar nitric acid to remove any metal cation impurities, or nitric acid plus hydrogen peroxide to remove metal cation impurities and organic impurities, followed by rinsing in deionized water) prior to deposition or lamination of catalyst (including catalyst-bearing nanostructured whiskers) to remove cation impurities. Heating the washing bath (e.g., to 30° C., 40° C., 50° C., 60° C., 70° C., or even 80° C.) may make the cleaning faster. Benefits of acid washing the membrane may depend on the particular membrane.

In making an MEA, GDLs may be applied to either side of a CCM. The GDLs may be applied by any suitable means. Suitable GDLs include those stable at the electrode potentials of use. For example, the cathode GDL can contain particulate carbon black or carbon fibers since it is operated at low potentials sufficient for adequate hydrogen evolution, whereas the anode GDL is typically made of Ti or some other material stable at the high potentials characteristic of oxygen evolution. Typically, the cathode GDL is a carbon fiber construction of woven or non-woven carbon fibers. Exemplary carbon fiber constructions include those available, for example, under the trade designation "TORAY" (carbon paper) from Toray, Japan; "SPECTRACARB" (carbon paper) from Spectracarb, Lawrence, Mass.; and "ZOLTEK" (carbon cloth) from Zoltek, St. Louis, Mo., as well as from Mitsubishi Rayon Co., Japan, and Freudenberg, Germany. The GDL may be coated or impregnated with various materials, including carbon particle coatings, hydrophilizing treatments, and hydrophobizing treatments such as coating with polytetrafluoroethylene (PTFE).

Typically, the electrolyzer anode GDL is metal foam or porous metal screen or mesh comprised, for example, of Pt, Ti, Ta, Nb, Zr, Hf, or a metal alloy that will not corrode (e.g., Ti-10V-5Zr) and yet will have adequate electrical conductivity (e.g., by sputter deposition or electroplating a layer of Pt onto the surface in the case of a Ti GDL) for the electrolyzer operation at the potentials of use above the thermodynamic potential for water oxidation at 1.23 V.

In use, MEAs described herein are typically sandwiched between two rigid plates, known as distribution plates, also known as end plates (or in case of a multi-cell stack, bipolar plates (BPPs)). Like the GDL, the distribution plates are electrically conductive and must be stable at the potentials of the electrode GDL against which it is placed. The distribution plate is typically made of materials such as carbon composite, metal, or coated or plated metals. As for the GDLs, the cathode plate of the electrolyzer can be any material common to use in fuel cells, whereas the anode plate of the electrolyzer must be fabricated of a material that will not corrode above potentials of 1.23 volt (in some embodiments, up to 1.5 volt, 2.5 volts, or even higher) relative to the potential of a reversible hydrogen electrode (RHE). An exemplary coating for the anode plate comprises Ti-10V-5Zr. The distribution plate distributes reactant or product fluids to and from the MEA electrode surfaces, typically through at least one fluid-conducting channel engraved, milled, molded, or stamped in the surface(s) facing the MEA(s). These channels are sometimes designated a flow field. The distribution plate may distribute fluids to and from two consecutive MEAs in a stack, with one face directing water to and oxygen from the anode of the first MEA while the other face directs evolved hydrogen and water (that crosses over the membrane) away from the cathode of the next MEA. Alternately, the distribution plate may have channels on one side only, to distribute fluids to or from an MEA on only that side, in which case the distribution plate may be termed an "end plate."

Pt (i.e., at least one of metallic or Pt oxide) is typically incorporated into the membrane via addition of the Pt containing salts to the membrane (imbibing), followed by chemical reduction typically using $NaBH_4$ or $H_2$. Supported Pt can also be incorporated into the membrane via addition of the carbon-supported Pt, which has been pre-wetted with deionized water, to the liquid suspension of the ionomer, followed by casting a membrane from the resultant mixture.

In some embodiments, the at least one of metallic Pt or Pt oxide is collectively present in the second region of the membrane at a concentration in a range from 0.05 $mg/cm^3$ to 100 $mg/cm^3$ (in some embodiments, in a range from 0.1 $mg/cm^3$ to 100 $mg/cm^3$, 1 $mg/cm^3$ to 75 $mg/cm^3$, or even 5 $mg/cm^3$ to 50 $mg/cm^3$).

In some embodiments, at least a portion of the at least one of metallic Pt or Pt oxide in the membrane is present on a support (e.g., a carbon support). Carbon supports include at least one of carbon spheres or carbon particles (in some embodiments, having an aspect ratio in a range from 1:1 to 2:1, or even 1:1 to 5:1). Exemplary carbon spheres are available, for example, from Cabot Corporation, Billerica, Mass., under the trade designations "VULCAN XC72" and "BLACK PEARLS BP2000." Exemplary carbon supports already coated with Pt catalysts are available, for example, from Tanaka Kikinzoku Kogyo K. K., Hiratsuka, Kanagawa, Japan, under the trade designations "TEC10F50E," "TEC10BA50E," "TEC10EA50E," "TEC10VA50E," "TEC10EA20E-HT," and "TEC10VA20E."

Carbon supports also include at least one of carbon nanotubes (e.g., single wall carbon nanotubes (SWNT) (sometimes referred to as "buckytubes"), double walled carbon nanotubes (DWNT), or multiple wall carbon nanotubes (MWNT)). Carbon nanotubes are available, for example, from Showa Denko Carbon Sales, Inc., Ridgeville, S.C., under the trade designation "VGCF-H."

Carbon supports include carbon fullerenes (sometimes referred to as "buckyballs"). Carbon fullerenes are available, for example, from Frontier Carbon Corporation, Chiyoda-ku, Tokyo, Japan, under the trade designation "NANOM."

Carbon supports include at least one of carbon nanofibers or carbon microfibers. Carbon nanofibers and carbon microfibers are available, for example, from Pyrograf Products, Inc., Cedarville, Ohio, under the trade designation "PYROGRAF-III."

In some embodiments, the supports include nanostructured whiskers (e.g., perylene red whiskers). Nanostructured whiskers can be provided by techniques known in the art, including those described in U.S. Pat. No. 4,812,352 (Debe), U.S. Pat. No. 5,039,561 (Debe), U.S. Pat. No. 5,338,430 (Parsonage et al.), U.S. Pat. No. 6,136,412 (Spiewak et al.), and U.S. Pat. No. 7,419,741 (Vernstrom et al.), the disclosures of which are incorporated herein by reference. In general, nanostructured whiskers can be provided, for example, by vacuum depositing (e.g., by sublimation) a layer of organic or inorganic material such as perylene red onto a substrate (e.g., a microstructured catalyst transfer polymer), and then converting the perylene red pigment into nanostructured whiskers by thermal annealing. Typically, the vacuum deposition steps are carried out at total pressures at or below about $10^{-3}$ Torr or 0.1 Pascal. Exemplary microstructures are made by thermal sublimation and vacuum annealing of the organic pigment "perylene red," C.I. Pigment Red 149 (i.e., N,N'-di(3,5-xylyl)perylene-3,4: 9,10-bis(dicarboximide)). Methods for making organic nanostructured layers are disclosed, for example, in Materials Science and Engineering, A158 (1992), pp. 1-6; J. Vac. Sci. Technol. A, 5 (4), July/August, 1987, pp. 1914-16; J. Vac. Sci. Technol. A, 6, (3), May/August, 1988, pp. 1907-11; Thin Solid Films, 186, 1990, pp. 327-47; J. Mat. Sci., 25, 1990, pp. 5257-68; Rapidly Quenched Metals, Proc. of the Fifth Int. Conf. on Rapidly Quenched Metals, Wurzburg, Germany (Sep. 3-7, 1984), S. Steeb et al., eds., Elsevier Science Publishers B.V., New York, (1985), pp. 1117-24; Photo. Sci. and Eng., 24, (4), July/August, 1980, pp. 211-16; and U.S. Pat. No. 4,340,276 (Maffitt et al.) and U.S. Pat. No. 4,568,598 (Bilkadi et al.), the disclosures of which are incorporated herein by reference. Properties of catalyst layers using carbon nanotube arrays are disclosed in the article "High Dispersion and Electrocatalytic Properties of Platinum on Well-Aligned Carbon Nanotube Arrays," Carbon, 42, (2004), 191-197. Properties of catalyst layers using grassy or bristled silicon are disclosed in U.S. Pat. App. Pub. No. 2004/0048466 A1 (Gore et al.).

Vacuum deposition may be carried out in any suitable apparatus (see, e.g., U.S. Pat. No. 5,338,430 (Parsonage et al.), U.S. Pat. No. 5,879,827 (Debe et al.), U.S. Pat. No. 5,879,828 (Debe et al.), U.S. Pat. No. 6,040,077 (Debe et al.), and U.S. Pat. No. 6,319,293 (Debe et al.), and U.S. Pat. App. Pub. No. 2002/0004453 A1 (Haugen et al.), the disclosures of which are incorporated herein by reference). One exemplary apparatus is depicted schematically in FIG. 4A of U.S. Pat. No. 5,338,430 (Parsonage et al.), and discussed in the accompanying text, wherein the substrate is mounted on a drum that is then rotated over a sublimation or evaporation source for depositing the organic precursor (e.g., perylene red pigment) in order to form the nanostructured whiskers.

Typically, the nominal thickness of deposited perylene red pigment is in a range from about 50 nm to 500 nm. Typically, the whiskers have an average cross-sectional dimension in a range from 20 nm to 60 nm and an average length in a range from 0.3 micrometer to 3 micrometers.

In some embodiments, the whiskers are attached to a backing. Exemplary backings comprise polyimide, nylon, metal foils, or other material that can withstand the thermal annealing temperature up to 300° C. In some embodiments, the backing has an average thickness in a range from 25 micrometers to 125 micrometers.

In some embodiments, the backing has a microstructure on at least one of its surfaces. In some embodiments, the microstructure is comprised of substantially uniformly shaped and sized features at least three (in some embodiments, at least four, five, ten or more) times the average size of the nanostructured whiskers. The shapes of the microstructures can, for example, be V-shaped grooves and peaks (see, e.g., U.S. Pat. No. 6,136,412 (Spiewak et al.), the disclosure of which is incorporated herein by reference) or pyramids (see, e.g., U.S. Pat. No. 7,901,829 (Debe et al.), the disclosure of which is incorporated herein by reference). In some embodiments, some fraction of the features of the microstructures extend above the average or majority of the microstructured peaks in a periodic fashion, such as every 31' V-groove peak is 25% or 50% or even 100% taller than those on either side of it. In some embodiments, this fraction of features that extend above the majority of the microstructured peaks can be up to 10% (in some embodiments up to 3%, 2%, or even up to 1%). Use of the occasional taller microstructure features may facilitate protecting the uniformly smaller microstructure peaks when the coated substrate moves over the surfaces of rollers in a roll-to-roll coating operation. The occasional taller feature touches the surface of the roller rather than the peaks of the smaller microstructures and so much less of the nanostructured material or whiskers is likely to be scraped or otherwise disturbed as the substrate moves through the coating process. In some embodiments, the nanostructured whiskers are at least partially embedded in the ion conducting membrane. In some embodiments, the microstructure features are substantially smaller than half the thickness of the membrane that the catalyst will be transferred to in making a membrane electrode assembly (MEA). This is so that during the catalyst transfer process, the taller microstructure features do not penetrate through the membrane where they may overlap the electrode on the opposite side of the membrane. In some embodiments, the tallest microstructure features are less than $\frac{1}{3}^{rd}$ or $\frac{1}{4}^{th}$ of the membrane thickness. For the thinnest ion exchange membranes (e.g., about 10 to 15 micrometers in thickness), it may be desirable to have a substrate with microstructured features no larger than about 3 to 4.5 micrometers tall. The steepness of the sides of the V-shaped or other microstructured features or the included angles between adjacent features in some embodiments may be desirable to be on the order of 90° for ease in catalyst transfer during a lamination-transfer process and in order to have a gain in surface area of the electrode that comes from the square root of two (1.414) surface area of the microstructured layer relative to the planar geometric surface of the substrate backing.

In some embodiments, the supports include tin oxide. Such tin oxide is available as already catalyzed $Pt/SnO_2$ in form of finely ground particles for example, from Tanaka Kikinzoku Kogyo K. K., Hiratsuka, Kanagawa, Japan, under the trade designation "TEC10($SnO_2$/A)10E" and "TEC10 ($SnO_2$/A)30E."

In some embodiments, the supports include clay. These clays can take the form of particles or platelets and may be synthetic or naturally occurring layered silicates. Such clay is available, for example, from BYK Additives and Instruments, GmbH, Wesel, Germany, under the trade designation "LAPONITE RD."

Platinum can be sputtered onto the support, for example, using the general teachings in U.S. Pat. No. 5,879,827 (Debe et al.), U.S. Pat. No. 6,040,077 (Debe et al.), and U.S. Pat. No. 7,419,741 (Vernstrom et al.), and U.S. Pat. Pub. No. 2014/0246304 A1 (Debe et al.), the disclosures of which are incorporated herein by reference. In some embodiments, sputtering is conducted at least in part in an atmosphere comprising argon that is flowing into the sputtering chamber at a rate of at least 120 sccm (i.e., standard cubic centimeters per minute).

The anode and cathode can be provided by techniques known in the art, including those described in PCT Pub. No. WO 2016/191057 A1, published Dec. 1, 2016, the disclosure of which is incorporated herein by reference. In general, the anode and cathode are each comprised of layers.

In some embodiments, the cathode comprises a first catalyst comprising at least one of metallic Pt or Pt oxide. In some embodiments, the first catalyst further comprises at least one of metallic Ir or Ir oxide. In some embodiments, the anode comprises a second catalyst comprising at least one of metallic Ir or Ir oxide. In some embodiments, the anode comprises at least 95 (in some embodiments at least 96, 97, 98, or even at least 99) percent by weight of collectively metallic Ir and Ir oxide, calculated as elemental Ir, based on the total weight of the second catalyst (understood not to include any support, if any), wherein at least one of metallic Ir or Ir oxide is present.

Typically, the planar equivalent thickness of a catalyst layer is in a range from 0.5 nm to 5 nm. "Planar equivalent thickness" means, in regard to a layer distributed on a surface, which may be distributed unevenly, and which surface may be an uneven surface (such as a layer of snow distributed across a landscape, or a layer of atoms distributed in a process of vacuum deposition), a thickness calculated on the assumption that the total mass of the layer was spread evenly over a plane covering the same projected area as the surface (noting that the projected area covered by the surface is less than or equal to the total surface area of the surface, once uneven features and convolutions are ignored).

In some embodiments, the anode catalyst comprises up to 1 $mg/cm^2$ (in some embodiments, up to 0.25 $mg/cm^2$, or even up to 0.025 $mg/cm^2$) of the at least one of metallic Ir or Ir oxide, calculated as elemental Ir. In some embodiments, the cathode catalyst comprises up to 1 $mg/cm^2$ (in some embodiments, up to 0.25 $mg/cm^2$, or even up to 0.025 $mg/cm^2$) of the at least one of metallic Pt or Pt oxide, calculated as elemental Pt. Typically, the catalyst is a continuous layer on each whisker and may form a bridge to adjacent whiskers.

In some embodiments where catalyst is coated on nanostructured whiskers (including perylene red nanostructured whiskers), the catalyst is coated in-line, in a vacuum, immediately following the nanostructured whisker growth step on the microstructured substrate. This may be a more cost-effective process so that the nanostructured whisker coated substrate does not need to be re-inserted into the vacuum for catalyst coating at another time or place. If the Ir catalyst coating is done with a single target, it may be desirable that the coating layer be applied in a single step onto the nanostructured whiskers so that the heat of condensation of the catalyst coating heats the Ir, 0, etc. atoms and substrate surface sufficiently to provide enough surface mobility that the atoms are well mixed and form thermodynamically stable domains. If the Pt catalyst coating is done with a single target, it may be desirable that the coating layer be applied in a single step onto the nanostructured whiskers so that the heat of condensation of the catalyst coating heats the Pt, 0, etc. atoms and substrate surface sufficiently to provide enough surface mobility that the atoms are well mixed and form thermodynamically stable domains. Alternatively, for perylene red nanostructured whiskers, the substrate can also be provided hot or heated to facilitate this atomic mobility, such as by having the nanostructured whisker coated substrate exit the perylene red annealing oven immediately prior to the catalyst sputter deposition step.

It will be understood by one skilled in the art that the crystalline and morphological structure of a catalyst described herein, including the presence, absence, or size of alloys, amorphous zones, crystalline zones of one or a variety of structural types, and the like, may be highly dependent upon process and manufacturing conditions, particularly when three or more elements are combined.

Further, catalysts described herein are useful for providing membrane electrode assemblies. "Membrane electrode assembly" refers to a structure comprising a membrane that includes an electrolyte, typically a solid polymer electrolyte, and at least one but more typically two or more electrodes adjoining the membrane.

In some embodiments, the second catalyst consists essentially of at least one of metallic Ir or Ir oxide (i.e., consists essentially of metallic Ir, consists essentially of Ir oxide, or consists essentially of both metallic Ir and Ir oxide). In some embodiments, the second catalyst comprises at least one of metallic Ir or Ir oxide. In some embodiments, the second catalyst further comprises at least one of metallic Pt or Pt oxide. In some embodiments, the second catalyst consists essentially of at least one of metallic Pt or Pt oxide and at least one of metallic Ir or Ir oxide.

For catalysts comprising or consisting essentially of at least one of metallic Ir or Ir oxide and at least one of metallic Pt or Pt oxide, the iridium and platinum, calculated as elemental Ir and Pt, respectively, have a collective weight ratio of at least 20:1 (in some embodiments, at least 50:1, 100:1, 500:1, 1000:1, 5,000:1, or even at least 10,000:1; in some embodiments, in a range from 20:1 to 10,000:1, 20:1 to 5,000:1, 20:1 to 1000:1, 20:1 to 500:1, 20:1 to 100:1, or even 20:1 to 50:1) Ir to Pt.

In some embodiments, the at least one of metallic Ir or Ir oxide of the second catalyst collectively has an areal density of at least 0.01 mg/cm$^2$ (in some embodiments, at least 0.05 mg/cm$^2$, 0.1 mg/cm$^2$, 0.25 mg/cm$^2$, 0.5 mg/cm$^2$, 1 mg/cm$^2$, or even at least 5 mg/cm$^2$; in some embodiments, in a range from 0.01 mg/cm$^2$ to 5 mg/cm$^2$, 0.05 mg/cm$^2$ to 2.5 mg/cm$^2$, 0.1 mg/cm$^2$ to 1 mg/cm$^2$, or even 0.25 mg/cm$^2$ to 0.75 mg/cm$^2$).

Water electrolyzers described herein are useful for generating hydrogen and oxygen from water, wherein water is in contact with the anode, and an electrical current is provided through the membrane with sufficient potential difference across the membrane to convert at least a portion of the water to hydrogen and oxygen on the cathode and anode, respectively.

EXEMPLARY EMBODIMENTS

1A. A water electrolyzer comprising:
  a membrane having first and second opposed major surfaces, a thickness extending between the first and second major surfaces, and first, second, and third regions equally spaced across the thickness, wherein the first region is the closest region to the first major surface, wherein the second region is the closest region to the second major surface, wherein the third region is located between the first and second regions, wherein the first and third regions are each essentially free of both metallic Pt and Pt oxide, and wherein the second region comprises at least one of metallic Pt or Pt oxide;
  a cathode comprising a first catalyst on the first major surface of the membrane; and
  an anode comprising a second catalyst on the second major surface of the membrane.

2A. The water electrolyzer of Exemplary Embodiment 1A, wherein the first catalyst comprises at least one of metallic Pt or Pt oxide.

3A. The water electrolyzer of Exemplary Embodiment 1A, wherein the first catalyst consists essentially of at least one of metallic Pt or Pt oxide.

4A. The water electrolyzer of any preceding A Exemplary Embodiment, wherein the second catalyst comprises at least 95 (in some embodiments, at least 96, 97, 98, or even at least 99) percent by weight of collectively metallic Ir and Ir oxide, calculated as elemental Ir, based on the total weight of the second catalyst, wherein at least one of metallic Ir or Ir oxide is present.

5A. The water electrolyzer of Exemplary Embodiment 4A, wherein the second catalyst consists essentially of at least one of metallic Ir or Ir oxide.

6A. The water electrolyzer of Exemplary Embodiment 4A, wherein the second catalyst further comprises at least one of metallic Pt or Pt oxide.

7A. The water electrolyzer of Exemplary Embodiment 6A, wherein the second catalyst consists essentially of at least one of metallic Pt or Pt oxide and at least one of metallic Ir or Ir oxide.

8A. The water electrolyzer of either Exemplary Embodiment 6A or 7A, wherein the at least one of metallic Ir or Ir oxide and at least one of metallic Pt or Pt oxide collectively has calculated as elemental Ir and Pt, respectively, a weight ratio of at least 20:1 (in some embodiments, at least 50:1, 100:1, 500:1, 1000:1, 5,000:1, or even at least 10,000:1; in some embodiments, in a range from 20:1 to 10,000:1, 20:1 to 5,000:1, 20:1 to 1000:1, 20:1 to 500:1, 20:1 to 100:1, or even 20:1 to 50:1) Ir to Pt.

9A. The water electrolyzer of any preceding A Exemplary Embodiment, wherein the at least one of metallic Ir or Ir oxide of the second catalyst collectively has an areal density of at least 0.01 mg/cm$^2$ (in some embodiments, at least 0.05 mg/cm$^2$, 0.1 mg/cm$^2$, 0.25 mg/cm$^2$, 0.5 mg/cm$^2$, 1 mg/cm$^2$, or even at least 5 mg/cm$^2$; in some embodiments, in a range from 0.01 mg/cm$^2$ to 5 mg/cm$^2$, 0.05 mg/cm$^2$ to 2.5 mg/cm$^2$, 0.1 mg/cm$^2$ to 1 mg/cm$^2$, or even 0.25 mg/cm$^2$, to 0.75 mg/cm$^2$).

10A. The water electrolyzer of any preceding A Exemplary Embodiment, wherein the membrane further comprises polymer electrolyte.

11A. The water electrolyzer of Exemplary Embodiment 10A, wherein the polymer electrolyte is at least one of perfluorosulfonic acid or perfluorosulfonimide acid.

12A. The water electrolyzer of any preceding A Exemplary Embodiment, wherein the at least one of metallic Pt or Pt oxide is collectively present in the membrane at a concentration in a range from 0.05 mg/cm$^3$ to 100 mg/cm$^3$ (in some embodiments, in a range from 0.1 mg/cm$^3$ to 100 mg/cm$^3$, 1 mg/cm$^3$ to 75 mg/cm$^3$, or even 5 mg/cm$^3$ to 50 mg/cm$^3$).

13A. The water electrolyzer of any preceding A Exemplary Embodiment, wherein the at least a portion of the at least one of metallic Pt or Pt oxide in the membrane is present on a support.

14A. The water electrolyzer of Exemplary Embodiment 13A, wherein the support comprises carbon.

15A. The water electrolyzer of Exemplary Embodiment 14A, wherein the support comprises at least one of carbon spheres or carbon particles (in some embodiments, having an aspect ratio in a range from 1:1 to 2:1, or even 1:1 to 5:1).

16A. The water electrolyzer of Exemplary Embodiment 14A, wherein the support comprises carbon nanotubes (e.g., single wall carbon nanotubes (SWNT) (sometimes referred to as "buckytubes") or multiple wall carbon nanotubes (MWNT)).

17A. The water electrolyzer of Exemplary Embodiment 14A, wherein the support comprises carbon fullerenes (sometimes referred to as "buckyballs").

18A. The water electrolyzer of Exemplary Embodiment 14A, wherein the support comprises at least one of carbon nanofibers or carbon microfibers.

19A. The water electrolyzer of Exemplary Embodiment 14A, wherein the support comprises nanostructured whiskers.

20A. The water electrolyzer of Exemplary Embodiment 19A, wherein the nanostructured whiskers comprise perylene red.

21A. The water electrolyzer of Exemplary Embodiment 14A, wherein the support comprises tin oxide.

22A. The water electrolyzer of Exemplary Embodiment 14A, wherein the support comprises clay.

1B. A method of generating hydrogen and oxygen from water, the method comprising:
providing a water electrolyzer of any preceding A Exemplary Embodiment;
providing water in contact with the anode; and
providing an electrical potential difference across the membrane with sufficient current to convert at least a portion of the water to hydrogen and oxygen on the cathode and anode, respectively.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

Examples

Materials for preparing the Examples include those in Table 1, below.

TABLE 1

| Abbreviation or Trade Designation | Source |
| --- | --- |
| "PR149" | Perylene red pigment (i.e., N,N'-di(3,5-xylyl)perylene-3,4:9,10-bis(dicarboximide)), obtained under the trade designation "C.I. PIGMENT RED 149," also known as "PR149," from Clariant, Charlotte, NC. |
| "NAFION 117" | A polymeric perfluorosulfonic acid (PFSA) cation exchange membrane, obtained under the trade designation "NAFION 117" from DuPont, Wilmington, DE. |
| "3M825EW MEMBRANE" | 825 g/mol equivalent weight polymeric perfluorosulfonic acid proton exchange membrane (PEM), obtained under the trade designation "3M825EW MEMBRANE" from 3M Company, St. Paul, MN. |
| "3M825EW POWDER" | 825 g/mol equivalent weight polymeric perfluorosulfonic acid ion exchange resin, obtained under the trade designation "3M825EW POWDER" from 3M Company. |
| "LAPONITE RD" | Clay particles obtained under the trade designation "LAPONITE RD" from BYK Additives, Inc., Wesel, Germany. |
| "Ir-NSTF" | 0.5 mg/cm² iridium/iridium oxide nanostructured thin film (NSTF) catalyst supported on perylene red whiskers, prepared as described below under the heading "Preparation of Nanostructured Thin Film (NSTF) Catalyst." |

TABLE 1-continued

| Abbreviation or Trade Designation | Source |
| --- | --- |
| "Pt-NSTF" | 0.25 mg/cm² nanostructured thin film (NSTF) catalyst supported on perylene red whiskers, prepared as described below under the heading "Preparation of Nanostructured Thin Film (NSTF) Catalyst." |
| "EA20E" | Carbon-supported platinum catalyst, obtained under the trade designation "TEC10EA20E-HT" from Tanaka Kikinzoku Kogyo K. K., Hiratsuka, Kanagawa, Japan. |
| "KAPTON" | Polyimide film, obtained under the trade designation "KAPTON" from DuPont, Wilmington, DE. |

Preparation of Nanostructured Whiskers

Nanostructured whiskers were prepared by thermally annealing a layer of perylene red pigment (PR 149) that was sublimation vacuum coated onto microstructured catalyst transfer polymer substrates (MCTS) with a nominal thickness of 200 nm, as described in detail in U.S. Pat. No. 4,812,352 (Debe), the disclosure of which is incorporated herein by reference.

A roll-good web of the MCTS (made on a polyimide film ("KAPTON")) was used as the substrate on which the PR149 was deposited. The MCTS substrate surface had V-shaped features with about 3 micrometer tall peaks, spaced 6 micrometers apart. A nominally 100 nm thick layer of Cr was then sputter deposited onto the MCTS surface using a DC magnetron planar sputtering target and typical background pressures of Ar and target powers known to those skilled in the art sufficient to deposit the Cr in a single pass of the MCTS web under the target at the desired web speed.

The Cr coated MCTS web then continued over a sublimation source containing the perylene red pigment (PR 149). The perylene red pigment (PR 149) was heated to a controlled temperature near 500° C. so as to generate sufficient vapor pressure flux to deposit 0.022 mg/cm², or an approximately 220 nm thick layer of the perylene red pigment (PR 149) in a single pass of the web over the sublimation source. The mass or thickness deposition rate of the sublimation can be measured in any suitable fashion known to those skilled in the art, including optical methods sensitive to film thickness, or quartz crystal oscillator devices sensitive to mass. The perylene red pigment (PR 149) coating was then converted to the whisker phase by thermal annealing, as described in detail in U.S. Pat. No. 5,039,561 (Debe), the disclosure of which is incorporated herein by reference, by passing the perylene red pigment (PR 149) coated web through a vacuum having a temperature distribution sufficient to convert the perylene red pigment (PR 149) as-deposited layer into a layer of oriented crystalline whiskers at the desired web speed, such that the whisker layer has an average whisker areal number density of 68 whiskers per square micrometer, determined from scanning electron microscopy (SEM) images, with an average length of 0.6 micrometer.

Preparation of Nanostructured Thin Film (NSTF) Catalyst

Nanostructured thin film (NSTF) Ir-based catalyst was prepared by sputter coating Ir catalyst films onto the layer of nanostructured whiskers (prepared as described above under the heading "Preparation of Nanostructured Whiskers").

Nanostructured thin film (NSTF) catalyst layers were prepared by sputter coating catalyst films using a DC-magnetron sputtering process onto the layer of nanostructured whiskers. A roll-good of nanostructured whiskers on MCTS substrate were loaded into a vacuum sputter deposition system similar to that described in FIG. 4A of U.S. Pat. No. 5,338,430 (Parsonage et al.), but equipped with additional capability to allow coatings on roll-good substrate webs. The coatings were sputter deposited by using ultra high purity Ar as the sputtering gas at approximately 5 mTorr pressure. Ir-NSTF catalyst layers were deposited onto the roll-good by first exposing all sections of the roll-good substrate to an energized 5 inch×15 inch (13 cm×38 cm) planar Ir sputtering target (obtained from Materion, Clifton, N.J.), resulting in the deposition of Ir onto the substrate. The magnetron sputtering target deposition rate and web speed were controlled to give the desired areal loading of Ir on the substrate. The DC magnetron sputtering target deposition rate and web speed were measured by standard methods known to those skilled in the art. The substrate was repeatedly exposed to the energized Ir sputtering target, resulting in additional deposition of Ir onto the substrate, until the desired Ir areal loading was obtained. An analogous process was used for formation of Pt-NSTF catalyst layers, but a pure 5 inch×15 inch (13 cm×38 cm) planar Pt sputter target (obtained from Materion, Clifton, N.J.) was used in place of Ir.

Preparation of Catalyst-Coated Membrane (CCM)

A catalyst-coated-membrane (CCM) was made by transferring the catalyst coated whiskers described above onto both surfaces (full CCM) of the proton exchange membrane (PEM) ("NAFION 117") using the processes as described in detail in U.S. Pat. No. 5,879,827 (Debe et al.). A Pt-NSTF catalyst layer was laminated to one side (intended to become the cathode side) of the PEM, and an Ir-NSTF catalyst layer was laminated to the other (anode) side of the PEM. The catalyst transfer was accomplished by hot roll lamination of the NSTF catalysts onto the PEM: the hot roll temperatures were 350° F. (177° C.) and the gas line pressure fed to force laminator rolls together at the nip ranged from 150 psi to 180 psi (1.03 MPa to 1.24 MPa). The catalyst coated MCTSs were precut into 13.5 cm×13.5 cm square shapes and sandwiched onto (one or) both side(s) of a larger square of PEM. The PEM with catalyst coated MCTS on one or both side(s), was placed between 2 mil (51 micrometer) thick polyimide film and then placed, paper on the outside, prior to passing the stacked assembly through the nip of the hot roll laminator at a speed of 1.2 ft./min. (37 cm/min.). Immediately after passing through the nip, while the assembly was still warm, the layers of polyimide and paper were quickly removed and the Cr-coated MCTS substrates were peeled off the CCM by hand, leaving the catalyst coated whiskers stuck to the PEM surface(s).

Full CCM Test

The full CCM fabricated as described above was tested in an $H_2/O_2$ electrolyzer single cell. The full CCM was installed with appropriate gas diffusion layers directly into a 50 cm² single fuel cell test station (obtained under the trade designation "50SCH" from Fuel Cell Technologies, Albuquerque, N. Mex.), with quad serpentine flow fields. The normal graphite flow field block on the anode side was replaced with a Pt plated Ti flow field block of the same dimensions and flow field design (obtained from Giner, Inc., Auburndale, Mass.) in order to withstand the high anode potentials during electrolyzer operation. Purified water with a resistivity of 18 Mohms was supplied to the anode at 75 mL/min. A potentiostat (obtained under the trade designation "VMP-3," Model VMP-3 from Bio-Logic Science Instruments SAS, Seyssinet-Pariset, France) coupled with a 100A/5V booster (obtained under the trade designation "VMP-300," from Bio-Logic Science Instruments SAS) was connected to the cell and was used to control the applied cell voltage or current density.

The anode output was connected to a gas chromatograph (obtained under the trade designation "MICRO490," Model 490 Micro GC from Agilent, Santa Clara, Calif.) for analysis of the output gas for hydrogen content. All tests were carried out at a temperature of 80° C. with deionized water (18 Mil cm) flowing at a rate of 75 mL/min. to the anode. The gas composition at the anode compartment was measured using gas chromatography. Under ambient pressure condition (i.e., 1 bar at the cathode compartment and 1 bar at the anode compartment), the level of $H_2$ crossover through each membrane to the anode was measured by measuring the mole percent of $H_2$ in $O_2$ at 80° C., varying current densities ranging from 2.0 to 0.05 A/cm².

Comparative Example A (CE A)

A catalyst-coated membrane (CCM) for a water electrolyzer was prepared using a 183-micrometer thick ion conducting membrane ("NAFION 117"). The CCM was prepared by hot roll laminating the membrane to a platinum-based hydrogen evolution reaction (HER) cathode catalyst layer and an iridium/iridium oxide based oxygen evolution reaction (OER) anode catalyst layer. These catalyst layers comprised nanostructured thin film (NSTF) catalysts, which were prepared as described below under the heading "Preparation of Nanostructured Thin Film (NSTF) Catalyst."

The resulting CCM was installed in a small single cell water electrolyzer and tested for hydrogen crossover through the membrane from the hydrogen-producing cathode to the oxygen-generating anode compartment by analyzing the effluent of the anode compartment with a gas chromatograph adapted to detect hydrogen gas. The test is further described under the heading "Full CCM Test."

The level of hydrogen crossover detected was 0.52 mol. % $H_2$ in $O_2$ when the cell was operated at a cathode (hydrogen side) pressure of 1 bar (0.1 MPa) and 1.79 mol. % $H_2$ in $O_2$ when the cell was operated at a cathode (hydrogen side) pressure of 30 bar (3 MPa). For efficiency, for example, it is often desired to operate electrolyzer cells at a hydrogen side pressure of 30 bar while staying far below the explosion limit of 4 mol. % $H_2$ in $O_2$. The average values of the mole percent of $H_2$ measured at 0.1 A/cm² over one hour are listed in Table 2, below.

TABLE 2

| Description Pt/Support type; Pt loading (mg/cm³); | Mol. % $H_2$ in $O_2$ | |
|---|---|---|
| Total membrane thickness (micrometers) | at 1 bar (0.1 MPa) | at 30 bar (3 MPa) |
| CE A "NAFION 117" (183) | 0.52 | 1.79 |
| CE B "3M825EW" Double layer (100) | 0.81 | >2.00 |
| CE C "3M825EW" Triple layer (125) | 0.356 | — |
| CE D "3M825EW" Triple layer (150) | 0.349 | — |
| CE E "3M825EW," clay interlayer (<110) | 0.663 | — |
| Example 1 "EA20E"-17-Triple layer (150) | 0.003 | |

Comparative Example B (CE B)

A full CCM was prepared and tested as in Comparative Example A, except that the membrane was made using two 50-micrometer thick 825 g/mol equivalent weight polymeric perfluorosulfonic acid proton exchange membranes ("3M825EW MEMBRANE") that were laminated together. The two membranes were combined into a single membrane through hot roll lamination (laminator temperature, 350° F. (177° C.); applied pressure, 150 psi (1 MPa); and roller speed: 0.5 feet per minute (2.54 mm/second)).

The values of the mole percent of $H_2$ measured at 0.1 $A/cm^2$ are listed in Table 2, above.

Comparative Example C (CE C)

A full CCM was prepared and tested as in Comparative Example B, except that a 125-micrometer thick membrane was used. The membrane was made by hot roll laminating two 50 micrometer and one 25-micrometer 825 g/mol equivalent weight polymeric perfluorosulfonic acid proton exchange membranes ("3M825EW MEMBRANE").

The values of the mole percent of $H_2$ measured at 0.1 $A/cm^2$ are listed in Table 2, above.

Comparative Example D (CE D)

A full CCM was prepared and tested as in Comparative Example B, except that a 150-micrometer thick membrane was used. The membrane was made by hot roll laminating three 50 micrometer thick 825 g/mol equivalent weight polymeric perfluorosulfonic acid proton exchange membranes ("3M825EW MEMBRANE").

The values of the mole percent of $H_2$ measured at 0.1 $A/cm^2$ are listed in Table 2, above.

Comparative Example E (CE E)

Comparative Example E was prepared by making a triple-layer composite containing a thin, platinum-free, clay-containing central layer. A CCM was prepared using two 50-micrometer thick 825 g/mol equivalent weight polymeric perfluorosulfonic acid proton exchange membranes (PEMs) ("3M825EW MEMBRANE") with a composite layer of perfluorosulfonic acid (PFSA) ionomer ("3M825EW") and clay ("LAPONITE RD") sandwiched between the PEMs. The clay layer was made by coating onto a 2 mil (51 micrometer) thick polyimide film ("KAPTON") a mixture of 1.00 gram of a 2.5 wt. % ethanol suspension of clay ("LAPONITE RD") with 10.5 grams of PFSA ionomer ("3M825EW SOLUTION"). The clay layer was then laminated first to one of the 50-micrometer thick PFSA membranes, and the "KAPTON" liner was removed. Laminations were done on a heated roller laminator with 150 psi (1 MPa) applied pressure, at 0.5 feet per minute (fpm) (2.54 mm per second minute), and at 350° F. (177° C.). Finally, the combined membrane was laminated to the second 50 micrometer thick PFSA membrane using the same laminating conditions, with the clay layer facing the second membrane.

The values of the mole percent of $H_2$ measured at 0.1 $A/cm^2$ are listed in Table 2, above.

Example 1

The membrane of Example 1 was prepared and tested as in Comparative Example D, except that one of the outer 50-micrometer-thick perfluorosulfonic acid ionomer layers (241) contained a carbon-supported platinum catalyst. During hydrogen crossover testing, the platinum-containing layer (181, 241) of the composite membrane was placed adjacent to the anode electrode layer of the electrolyzer. The platinum-bearing layer was prepared as follows. A 9 wt. % suspension of platinum catalyst supported on carbon ("EA20E") was prepared by stirring 0.9 gram of the supported catalyst into 9 grams of deionized (DI) water, with continued stirring overnight. (This 9 wt. % recipe can be scaled up proportionally if more solution is needed, as was the case in this example). A 42 wt. % polymeric perfluorosulfonic acid (PFSA) solution was prepared by stirring 40 grams of 825 g/mol equivalent weight PFSA ion exchange resin ("3M825EW POWDER") into 55.4 grams of an 80:20 by weight percent ethanol (EtOH) to water. A membrane casting formulation was prepared from a blend composed of 19.96 grams of the 42 wt. % PFSA solution and 10.78 grams of the 9 wt. % suspension of "EA20E" (see Table 3, above). The resulting mixture (i.e., composite formulation) was then immediately used to cast a membrane. A 5 inch (12.7 cm) wide microfilm applicator (wet film thickness: 15 mils (0.38 millimeter) Paul N. Gardner Company, Inc., Pompano Beach, Fla.) was used to coat a 2 mil (51 micrometer) thick polyimide film ("KAPTON") with the composite mixture. The coated sample was dried at 70° C. for 15 minutes and then at 120° C. for 30 minutes, followed by annealing at 160° C. for 10 minutes. The annealed sample was then cooled down to room temperature.

Figure 2:
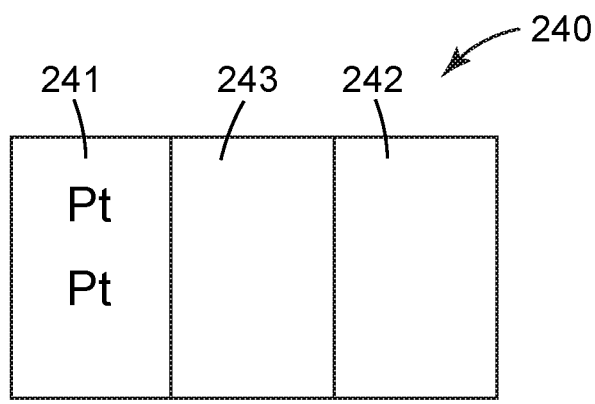
FIG. 2 is a side view of an exemplary membrane described herein.

To prepare triple-layer membrane 240 of FIG. 2, the resulting annealed membrane 241 was laminated with two 50-micrometer-thick 825 g/mol equivalent weight polymeric perfluorosulfonic acid proton exchange membranes ("3M825EW MEMBRANE") (242, 243) such that the annealed "EA20E" PFSA membrane formed a third outer layer adjacent to the two 825 g/mol equivalent weight polymeric PFSA membranes ("3M825EW MEMBRANE") (laminator temperature, 350° F. (177° C.); applied pressure, 150 psi (1 MPa); and roller speed, 0.5 feet per minute (2.54 mm per second)). During hydrogen crossover testing, the platinum-bearing layer (181, 241) was located adjacent to the anode side in the resulting CCM, as shown in FIGS. 1 and 2. The platinum-bearing layer, Layer 1, corresponds to item 181 in FIG. 1 and item 241 in FIG. 2. The composition and construction of the ion conducting membrane of Example 1 is shown in Table 3, below. The two 50-micrometer-thick "3M825EW MEMBRANE" PFSA membranes correspond to Layer 2 (242) and Layer 3 (243), respectively, in Table 3 and FIG. 2.

The hydrogen crossover test results are listed in Table 2, above.

TABLE 3

| | Layer 1 Formulation | | | Membrane | | | |
| --- | --- | --- | --- | --- | --- | --- | --- |
| | PFSA solution | | Pt/Support suspension | | Layer 1 | Layer 2 | Layer 3 |
| | PFSA Solution Type | grams | Pt/Support Type | grams | Wet film thickness, micrometers | Dried film thickness, micrometers | "PFSA 825EW," micrometers | "PFSA 825EW," micrometers |
| Example 1 | 42 wt. % | 19.96 | "EA20E" | 10.78 | 381 | 50 | 50 | 50 |

Foreseeable modifications and alterations of this disclosure will be apparent to those skilled in the art without departing from the scope and spirit of this invention. This invention should not be restricted to the embodiments that are set forth in this application for illustrative purposes.

What is claimed is:

1. A water electrolyzer comprising:
   a membrane having first and second opposed major surfaces, a thickness extending between the first and second major surfaces, and first, second, and third regions equally spaced across the thickness, wherein the first region is the closest region to the first major surface, wherein the second region is the closest region to the second major surface, wherein the third region is located between the first and second regions, wherein the first and third regions are each essentially free of both metallic Pt and Pt oxide, and wherein at least one of metallic Pt or Pt oxide is incorporated into the second region;
   a cathode comprising a first catalyst on the first major surface of the membrane; and
   an anode comprising a second catalyst on the second major surface of the membrane.

2. The water electrolyzer of claim 1, wherein the first catalyst comprises at least one of metallic Pt or Pt oxide.

3. The water electrolyzer of claim 1, wherein the first catalyst consists essentially of at least one of metallic Pt or Pt oxide.

4. The water electrolyzer of claim 1, wherein the second catalyst comprises at least 95 percent by weight of collectively metallic Ir and Ir oxide, calculated as elemental Ir, based on the total weight of the second catalyst, wherein at least one of metallic Ir or Ir oxide is present.

5. The water electrolyzer of claim 4, wherein the second catalyst consists essentially of at least one of metallic Ir or Ir oxide.

6. The water electrolyzer of claim 4, wherein the second catalyst further comprises at least one of metallic Pt or Pt oxide.

7. The water electrolyzer of claim 6, wherein the second catalyst consists essentially of at least one of metallic Pt or Pt oxide and at least one of metallic Ir or Ir oxide.

8. The water electrolyzer of claim 6, wherein the at least one of metallic Ir or Ir oxide and at least one of metallic Pt or Pt oxide collectively has, calculated as elemental Ir and Pt, respectively, a weight ratio of at least 20:1 Ir to Pt.

9. The water electrolyzer of claim 1, wherein the at least one of metallic Ir or Ir oxide of the second catalyst has an areal density of at least $0.01$ mg/cm$^2$.

10. The water electrolyzer of claim 1, wherein the membrane further comprises polymer electrolyte.

11. The water electrolyzer of claim 1, wherein the at least one of metallic Pt or Pt oxide is collectively present in the membrane at a concentration in a range from $0.05$ mg/cm$^3$ to $100$ mg/cm$^3$.

12. The water electrolyzer of claim 1, wherein the at least a portion of the at least one of metallic Pt or Pt oxide in the membrane is present on a support.

13. A method of generating hydrogen and oxygen from water, the method comprising:
    providing a water electrolyzer of claim 1;
    providing water in contact with the anode; and
    providing an electrical potential difference across the membrane with sufficient current to convert at least a portion of the water to hydrogen and oxygen on the cathode and anode, respectively.

* * * * *